2,713,023

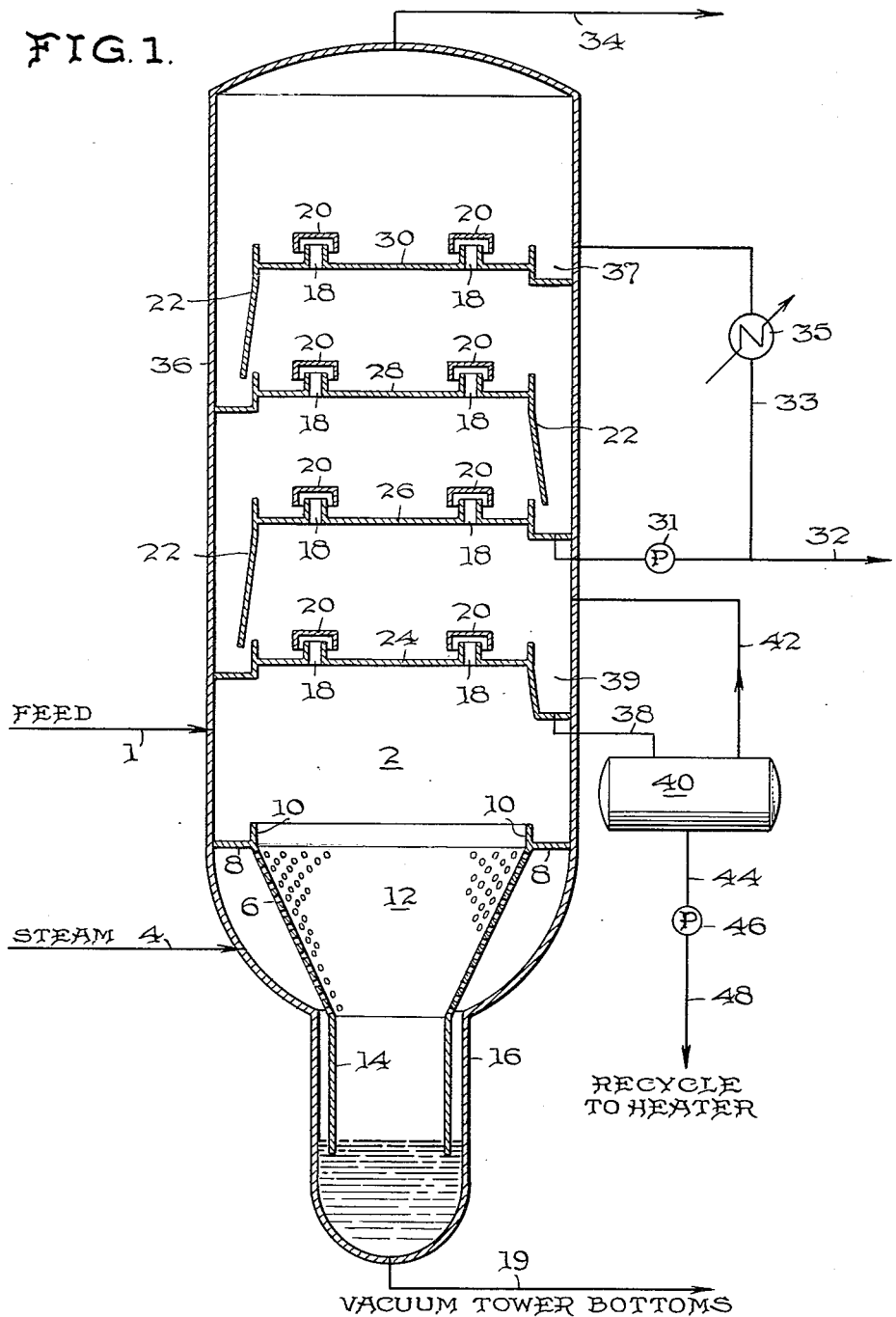

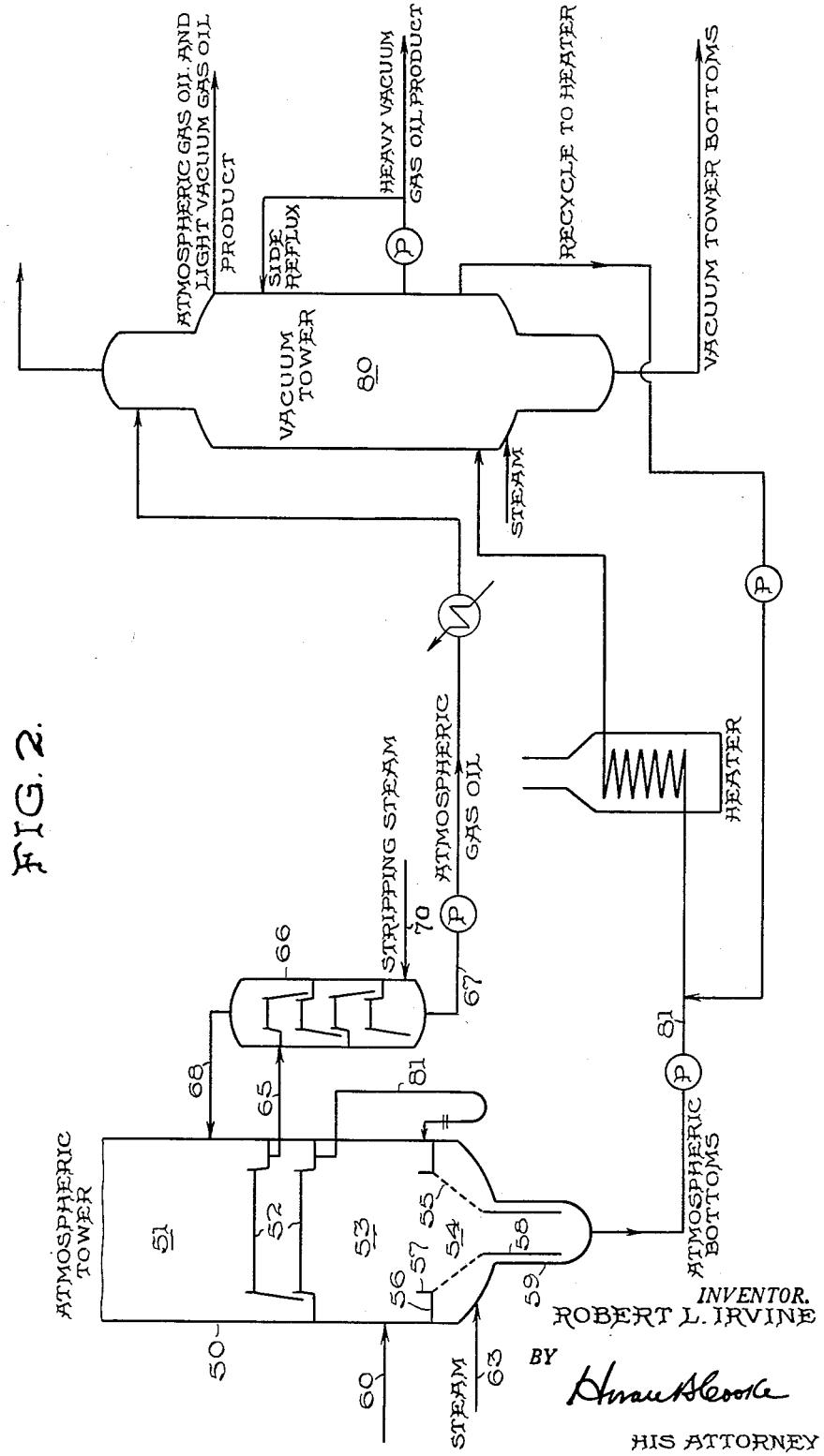

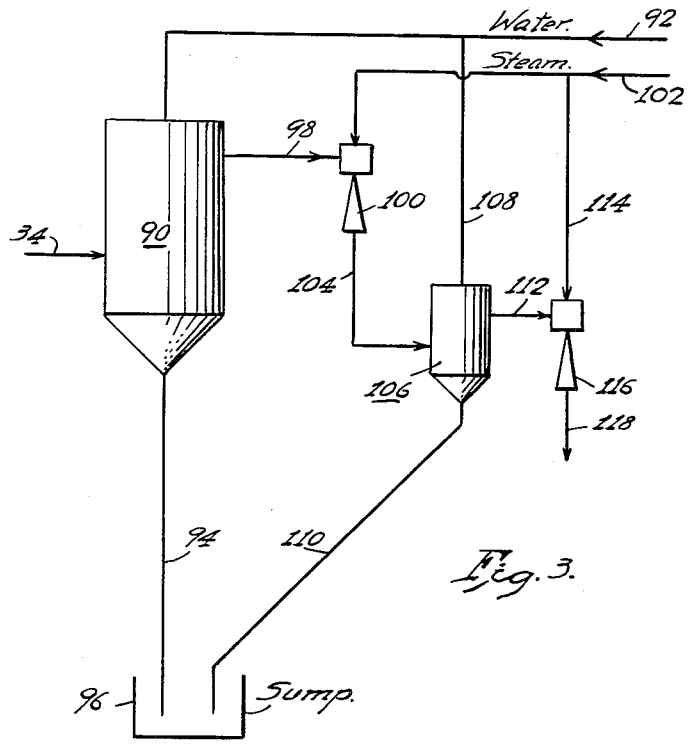
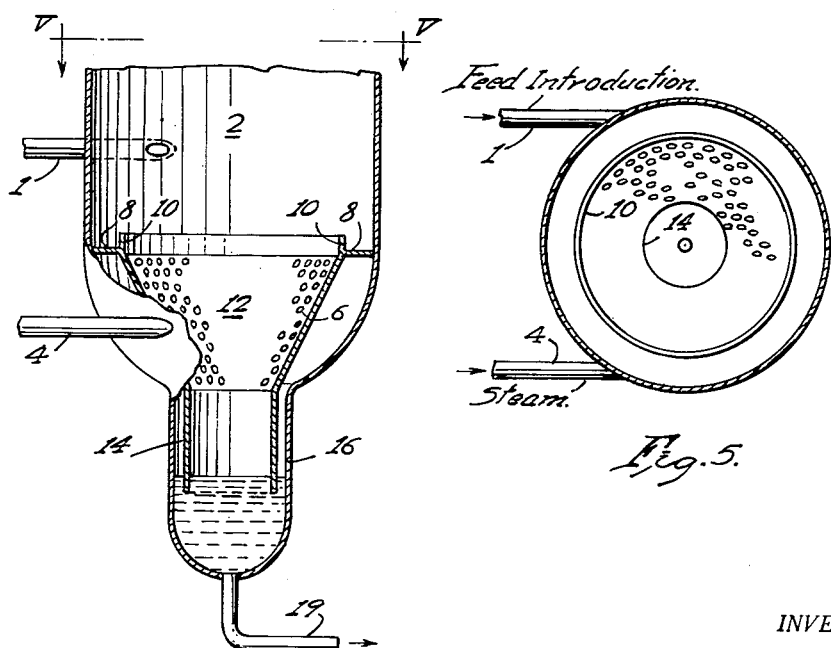

FRACTIONATING METHOD AND APPARATUS

Robert L. Irvine, Belle Fons Farm, Pa., assignor to Gulf Oil Corporation, Pittsburgh, Pa., a corporation of Pennsylvania Application July 15, 1952, Serial No. 299,037

9 Claims. (Cl. 202—40)

This invention relates to an improved fractionating method and apparatus, and more particularly to a fractionating method and apparatus providing improved stripping and flashing of the feed, whereby greater vaporization of the feed is achieved, and whereby lower stripping medium pressures are required.

Fractionating towers, whether operated at atmospheric pressure or under vacuum, may conventionally involve a fractionating section positioned in the upper portion of the tower (comprising, for example, packing, a plurality of connected fractionating trays or equivalent means for obtaining vapor-liquid contact), a stripping section in the lower portion of the tower, and a flash section positioned intermediately of the stripping section and the fractionating section previously mentioned.

Conventionally, both the fractionating section and the stripping section involve a plurality of bubble cap trays, or other means of equivalent function, through which downflowing liquid components pass in countercurrent contact with upwardly flowing vapors. The flash section may simply comprise a compartment between the uppermost portion of the stripping section and the lowermost portion of the fractionation section.

Thus, preheated feed, normally partly vaporized, is introduced into the flash section for initial vaporization. Vaporized components pass upwardly through the fractionating section in countercurrent contact with downflowing liquid. Unvaporized liquid passes downwardly from the flash section into the stripping section, where it is stripped by countercurrent flow with upflowing stripping gas such as steam. Stripping gas and stripped components pass upwardly through the flash section and fractionating section, together with vaporized feed originating in the flash section. Vaporous materials are removed overhead by way of an overhead take-off line and unvaporized liquid residue or "bottoms" is removed at the bottom of the stripping section. Fractionated material may be removed in the form of liquid or vapor side-streams from the fractionating section.

In the separation of thermally decomposable liquid mixtures containing difficultly vaporizable components, such as topped crude oil, vacuum fractionating towers are customarily employed, in order that the separation of the components may be effected at temperatures below their decomposition temperatures. By "difficultly vaporizable" components is meant materials which cannot be appreciably vaporized without substantial thermal decomposition.

In the refinining of crude petroleum it is customary to subject the total crude to an initial fractionation in an atmospheric tower to remove the lighter ends. Following this step the balance of the crude, containing primarily high boiling constituents, is subjected to vacuum fractionation. The reduced pressures employed in vacuum fractionation permit a greatly increased degree of vaporization at relatively low temperatures which are substantially less conducive to thermal decomposition.

Vacuum fractionating towers differ from the conventional apparatus described above principally in that means for inducing a partial vacuum in the tower are employed. Customarily, these means may involve a vacuum pump, a steam jet device, or the like, in association with the overhead condensers and take-off line at the top of the tower.

Although the reduced pressure employed in vacuum fractionating towers reduces the temperature required to vaporize volatile components of the feed, one difficulty encountered in conventional vacuum fractionating systems is that the temperature at which the tower may be maintained is limited by the residence or hold-up time of the liquid residue in the stripping zone. The resistance to liquid flow provided by the bubble cap trays or similar elements in the stripping section results in a substantial residence time in the fractionating tower for the stripped, unvaporized liquid components. Any attempt to increase the temperature at which the vacuum tower is operated in order to increase the yield of vaporized components may result in thermal decomposition of the high boiling, liquid bottoms. This is undesirable, since coking in the stripping zone may result. Conversely, decreasing the residence time in the stripping section may reduce the degree of stripping obtained.

A further difficulty encountered in conventional vacuum fractionating apparatus is that the passageways through the stripping section may become plugged by solids entrained in the tower bottoms.

Another difficulty involved in conventional vacuum fractionating towers is that homogeneous contact of stripping vapors with liquid is not achieved either in the stripping or in the flash section. Due to the nature of the structure employed, only a relatively small portion of the liquid in the stripping or the flash section may be contacted with stripping vapors.

In addition to the difficulties listed above, a considerable pressure drop is normally present across the stripping section of conventional vacuum towers. This is undesirable, since the partial pressure of the components to be stripped is adversely affected by increased pressure in the stripping section.

The difficulties described above may effectively limit the amount of materials which can be successfully vaporized and recovered. The loss in vaporized constituents appears in the form of increased vacuum tower bottoms, an undesirable, low-quality product.

In atmospheric fractionation, the conventional apparatus may also have disadvantages. By "atmospheric fractionation" is meant fractionation carried out at about atmospheric pressure. In atmospheric fractionation as well as in vacuum fractionation, an excessive residence time of liquid in the stripping section can limit the temperature at which the tower can be operated without causing thermal decomposition of the bottoms liquid. Therefore, for maximum vaporization in the atmospheric tower it is also desirable to reduce the residence time of the tower bottoms so that a higher tower temperature can be maintained.

Another characteristic of conventional atmospheric fractionation which can be a disadvantage is the high back pressure on the stripping steam in the conventional type of bottoms stripping section. Ordinarily, in atmospheric fractionation a large quantity of steam is required for stripping the tower bottoms liquid and each side stream. This stream is most conveniently supplied from a single source and at the same pressure for all stripping purposes. Normally, the highest pressure in the tower is at its bottom, so that the pressure of all stripping steam supplied to the tower is governed by the tower bottom pressure. Therefore, any reduction of the back pressure of the steam introduced to the bottom of the tower, as by reducing the pressure drop through the bottoms stripping section, will have the advantage of permitting lower steam pressures in the bottoms stripping section and also in each side stream stripper.

An object of this invention is to provide a method and apparatus whereby one or more of the foregoing difficulties is overcome. It is also an object of this invention to provide an improved fractionating method and apparatus by means of which a high degree of vaporization of the feed is achieved without substantial thermal decomposition thereof and by means of which unvaporized tower bottoms are reduced substantially. A further object is to provide a fractionating method and apparatus which will make possible a more thorough intercontact between stripping vapors and liquid in both the stripping section and the flash section. A more detailed object is to provide an improved fractionating method and apparatus permitting a reduction in the residence time of the liquid in the stripping section while obtaining an excellent degree of stripping efficiency, whereby higher temperatures may be utilized without decomposition of the charge. Another object of the invention is to reduce the pressure drop through the stripping section. A limited object is the provision of an interrelated atmospheric and vacuum fractionating method and apparatus, wherein the load on the vacuum tower is minimized. Other objects will appear hereinafter.

These and other objects are accomplished by my invention which comprises a fractionating method and apparatus. The apparatus includes a tower having a fractionating section in the upper portion thereof, a stripping section in its lower portion, a flash section positioned intermediately between the fractionating section and the stripping section, means forming a vapor passageway connecting the flash section and the fractionating section, means for introducing preheated feed into the flash section, means for introducing stripping vapor into the stripping section, stripping means within said stripping section adapted to form stripping vapor into a multiplicity of jets and adapted to direct said jets upwardly and toward the vertical axis of the stripping section, said stripping means being adapted to receive downflowing unvaporized material from said flash section, and being adapted to distribute upflowing vapors into the flash section, means for directing unvaporized liquid from the bottom of the stripping means into a liquid-accumulating compartment positioned at the base of sad tower, means for withdrawing unvaporized liquid from the liquid-accumulating compartment, and means for removing fractionated material from the tower. According to the improved method of the invention, stripping vapor is formed into a multiplicity of jets, preferably relatively small and substantially uniformly disposed, and then directed upwardly and inwardly toward the vertical axis or center of the stripping zone.

Referring now briefly to the drawings, Figure 1 is a schematic representation of a vacuum tower embodying the improvements of this invention. Figure 2 is a somewhat less detailed flow diagram of an interrelated atmospheric and vacuum fractionating system utilizing the principles of the invention. Figure 3 is a schematic representation of a conventional, two-stage, barometric condenser and steam jet system. Figure 4 is a fragmentary, vertical section of the apparatus illustrated in Figure 1, showing in greater detail the structure of the tangentially discharging feed line and stripping vapor line. Figure 5 is a vertical section taken on the line V—V of the apparatus shown in Figure 4. In the several figures of drawings, like numerals refer to like structure.

The invention may be most easily understood with more detailed reference to the drawings. Referring now to Figure 1 in detail, numeral 36 denotes the vacuum fractionating tower proper. Bubble cap trays 24, 26, 28 and 30 are mounted transversely of tower 36 and form a plurality of vertically spaced, fractionating compartments comprising a fractionating section. Although only a small number of bubble cap trays have been illustrated, it will be understood by those skilled in the art that a tower of any length having any number of trays or equivalent elements may be employed, depending on the type of separation desired.

Numerals 18 refer to means forming vapor passageways through the respective trays 24, 26, 28 and 30. Numerals 20 refer to the bubble caps for the vapor passageways 18. Bubble caps 20 are adapted to direct the upflowing vapors beneath the surface of and into contact with the liquid layer retained on the upper surfaces of bubble cap trays 24, 26, 28 and 30.

Numeral 2 denotes the flash section into which preheated feed is introduced by way of line 1. Numeral 8 refers to an annular, liquid-retaining tray positioned at the bottom of flash zone 2 and attached at its outer periphery to the inner surface of the tower. Numeral 10 refers to the liquid-retaining weir for tray 8.

Numeral 12 refers to the stripping section of the tower; and numeral 6 denotes a hollow, perforated, frusto-conical stripping member positioned base upward within the tower. The divergent upper end of frusto-conical member 6 is adapted to receive downflowing, unvaporized material from flash zone 2 and liquid retaining tray 8. Member 6 is further adapted to distribute upflowing vapors into a major portion of flash chamber 2. Member 6 contains a multiplicity of relatively small, substantially uniformly spaced perforations. Member 6 is associated indirectly at its upper end with the inner surface of the tower by attachment to the inner periphary of annular tray 8.

Numeral 4 denotes a line adapted to introduce stripping vapors such as steam or other inert gas or vapor into the stripping section of the tower beneath frusto-conical member 6.

Numeral 14 refers to a hollow, cylindrical, drain-leg member adapted to direct unvaporized liquid flowing downwardly from stripping zone 12 into liquid-accumulating compartment 16. Liquid-accumulating compartment 16 has a cross-sectional area equal to only a minor fraction of the cross-sectional area of tower 36. Hollow cylindrical member 14 has a cross-sectional area of slightly less than that of liquid-accumulating chamber 16. Member 14 is attached at its upper end to the lower end of member 6 to form an extension of the latter which is concentric with member 6, with tower 36 and compartment 16. Drain-leg 14 extends nearly to the bottom of compartment 16. A liquid level control, not shown, is normally provided to maintain the liquid level in compartment 16 above the lower end of drain-leg 14.

Numerals 22 refer to downcomers adapted to direct liquid overflowing from the upper surfaces of trays 26, 28 and 30 into the respective next lower trays. Numeral 24 refers to a wash tray or condensate tray at the bottom of the fractionating section which is adapted to collect liquid condensate flowing down through the fractionating section. Numerals 19 and 34, respectively, refer to lines for removing vacuum tower bottoms and overhead vapors. Numerals 31 and 32 represent respectively a pump and a line adapted to remove a product side stream from fractionating tray 28. The number of side streams may be varied as desired. Where desired, line 33 and cooler 35 may be utilized to return a portion of the illustrated side stream to trap 37 of the tower 36 as reflux, whereby the liquid flowing down from the top of the fractionating section is augmented with fractionated material from a position lower in the fractionating zone. Numeral 40 refers to a recycle drawoff drum which receives liquid from liquid trap 39 at one side of lowermost bubble cap tray 24. Numerals 44, 46 and 48 denote respectively a line, a pump and a line adapted to return liquid from drum 40 to the charge heater, not shown.

In operation, a partial vacuum is induced in tower 36 by conventional means positioned downstream of the tower and in association with line 34. A conventional vacuum producing means, suitable for the purposes of this invention, is illustrated in Figure 3. In the device there shown, overhead vapors from the vacuum tower pass through line 34 into condenser 90, where the major portion of the vapors is condensed by direct heat exchange with water introduced into the condenser by way of line 92. Water and condensed vapors pass through barometric leg 94 into sump 96. The reduction in gas volume in condenser 90 caused by condensation of vapors induces a partial vacuum in line 34 which is transmitted to the vacuum tower. The remaining uncondensed vapors in condenser 90 are aspirated from the condenser by way of line 98 by means of steam eductor 100. The steam is introduced into steam eductor 100 by way of line 102. Steam and uncondensed vapors from condenser 90 pass through line 104 into condenser 106, where a further condensation of vapors is caused by direct heat exchange with cooling water from line 108. Water and condensed vapors pass from condenser 106 through barometric leg 110 into sump 96. Any remaining uncondensed vapors are removed from condenser 106 by aspiration through line 112. Steam eductor 116 is operated by steam from line 114. Steam and uncondensed vapors from eductor 116 pass out of the system through line 118.

The feed to the fractionating tower, for example, topped or reduced crude oil, is preheated by means not shown and introduced, preferably tangentially as illustrated in Figures 4 and 5, into flash section 2 by way of line 1. If desired, steam or other vapor may be introduced in admixture with the feed. Although some vaporization may occur in the preheater, the feed is normally at least predominantly liquid upon introduction into the flash section. Substantial vaporization of feed occurs in flash section 2. Unvaporized liquid passes downwardly from flash zone 2 into stripping zone 12. Most of the tangentially introduced unvaporized liquid collects on tray 8 because of centrifugal force. This liquid is distributed uniformly into zone 12 by flowing over distributing weir ring 10.

Steam, from a source not shown, is introduced into the system by way of line 4 from which it passes into the tower beneath frusto-conical member 6. Preferably, the steam is also introduced tangentially to the inner circumference of the tower, but in a direction opposite, or counterwise, to that of the feed; see particularly the structure illustrated in Figures 4 and 5. This procedure provides thorough contact between the steam and the feed.

Steam is formed into a plurality of jets at a plurality of elevations in the tower by the perforations of member 6, and with greater elevation in the stripping zone, at greater distances from the vertical axis thereof. The steam jets so formed are directed upwardly and in toward the vertical axis of stripping zone 12, where intimate contact with unvaporized liquid is achieved. The reduction in partial pressure of the liquid caused by the stripping steam enables further vaporization of the liquid in stripping compartment 12. Stripping steam and stripped vapors pass upwardly from stripping zone 12 into flash compartment 2, where substantially homogeneous mixture of stripping steam, stripping vapors and feed is obtained.

It will be noted that the frusto-conical space above member 6 provides little resistance to flow of unvaporized materials from flash section 2, far less than the baffles, bubble cap trays or the like normally used in stripping. Accordingly, liquid material passing downwardly from flash section 2 passes quickly through the stripping zone and into liquid-accumulating compartment 16. The rapid passage of unvaporized constituents through the stripping zone is achieved with excellent stripping efficiency, since the perforations of frusto-conical member 6 permit thorough intermixture of stripping vapors with unvaporized liquid. Moreover, the absence of any substantial obstructions to vapor flow through the stripping section 12 and flash section 2 effectively reduces the pressure drop through these sections of the tower.

A thorough degree of stripping is achieved, since the stripping steam is simultaneously introduced in the form of jets through a multiplicity of relatively small, uniformly spaced perforations. In this manner, the material to be stripped is contacted with a relatively large amount of steam in a short time. Any liquid material which finds its way to the upper surface of member 6 tends to flow downwardly, due to the slope of the surface. Such material is substantially immediately forced outwardly and upwardly from the surface of member 6 in the form of minute droplets having large surface areas. Within stripping section 12 and flash section 2, there is at all times an intimate mixture of suspended droplets and steam. A uniform, thorough degrees of stripping is thereby achieved. According to this invention, the upper surface of member 6 is substantially free of liquid at all times. Also, with the reduction of the pressure drop through the stripping and flash sections of the apparatus, more complete vaporization of liquid is achieved with the same stripping steam pressure, or alternatively, the same degree of stripping can be obtained with reduced stripping steam pressure.

The stripping achieved in the stripping section of the invention is to be contrasted sharply with conventional stripping with, for example, bubble cap trays, where stripping gas may contact only that liquid immediately adjacent the bubble caps, and where there is a substantial pressure drop across the stripping section.

The more rapid stripping permitted by my improved stripping means results in a substantial reduction in residence or hold-up time of the unvaporized material in the tower 36 and particularly in stripping zone 12. As a result, substantially higher temperatures may be employed in the fractionating tower. As is well known in the art, thermal decomposition is a time-temperature reaction. Accordingly, any decrease in the time to which the liquid bottoms are subjected to decomposition temperatures permits a corresponding increase in the maximum temperature which may be employed in the tower, without any increase in the degree of thermal decomposition of the oil. However, higher temperatures are not necessary, since improved vaporization is achieved in their absence.

Another important feature of the improved stripping means 6 is the fact that the wide, upper end of frusto-conical member 6 permits introduction of stripping steam and stripped vapors from stripping zone 12 over a large portion of the cross-sectional area of flash section 2. As a result, more homogeneous intermixture of feed, stripping steam, and stripped vapors is achieved in flash section 2.

Preferably, the angle formed by the sloped surface of frusto-conical member 6 with the horizontal is greater than the angle of repose of solids encountered in the stripping section. This expedient makes the stripping section self-cleaning. This is to be contrasted with conventional stripping means whose vapor and/or liquid passageways may become plugged by solids entrained in the tower bottoms.

Vaporized components of the feed and stripping vapors pass upwardly through fractionating trays 24, 26, 28 and 30 by way of apertures 18 and bubble caps 20. As stated above, bubble caps 20 are adapted to direct the upflowing vapors beneath the surface of the liquid retained on the upper surfaces of fractionating trays 24, 26, 28 and 30. Vaporized constituents are removed from the top of the tower by way of line 34 from which they pass to condensers for recovery and further treatment, if desired. Liquid overflowing from the bubble cap trays is directed to the next lower fractionating tray by way of downcomers 22.

A heater recycle is provided by withdrawing liquid from lowermost bubble cap tray 24 by way of line 38 to recycle drawoff drum 40. Vapors from recycle drawoff drum 40 are vented to the compartment above the lowermost bubble cap tray 24 by way of line 42. Unvaporized liquid is recycled from drum 40 by way of line 44 through pump 46 and line 48 to the heater, not shown.

As has been stated above, liquid-accumulating compartment 16 is preferably of a cross-sectional area equal to a minor fraction of the cross-sectional area of tower 36. This feature constitutes a further improvement over prior art vacuum fractionating towers in that the reduced cross-sectional area of the liquid accumulator further increases the velocity of bottoms passing out of the tower, thereby further lowering residence time. The design ratio of the cross-sectional area of the liquid-accumulating compartment 16 to tower cross-sectional area may be, for example, between about 0.05:1.0 and about 0.5:1.0. This is as compared to the unreduced or only slightly reduced cross-sectional area of the liquid-accumulating chambers of conventional towers. The design limits for the ratio of the liquid accumulator cross-sectional area and the tower cross-sectional area vary according to the stock to be processed and the amount of liquid bottoms produced therefrom.

The advantages of the process and apparatus of my invention which have been described in detail for vacuum fractionation are obtainable in general also in atmospheric fractionation with certain differences in degree due to the inherent differences in vacuum and atmospheric fractionation. For example, in atmospheric fractionation with the process and apparatus of my invention the residence time of bottoms liquid is reduced so that the tower temperature can be increased without thermal decomposition of bottoms liquid. Also, the pressure drop through the stripping section is reduced in substantially the same degree, although in less proportion to the total pressure, so that the pressure of stripping steam can be reduced.

The application of the process and apparatus of the invention to atmospheric fractionation can be most easily understood with detailed reference to Figure 2 of the drawing. In Figure 2, numeral 50 denotes an atmospheric tower having a fractionating section 51, a flash section 53, and a stripping section 54. The fractionating section 51 is provided with conventional vapor-liquid contacting means such as bubble cap trays 52.

The stripping section 54 of tower 50 is provided with a hollow, perforated, frusto-conical member 55 positioned base upward within the tower substantially in the same manner as the member 6 of the vacuum tower 36 in Figure 1. As Figure 2 shows, the elements associated with the stripping member 55 are substantially the same as those shown with stripping member 6 in Figure 1, there being an annular liquid retaining tray 56, a liquid retaining weir 57, and a drain-leg 58 extending into the reduced cross-sectional area compartment 59. Each of the mentioned elements has substantially the same function as described for corresponding elements in the vacuum tower of Figure 1.

The feed to the atmospheric tower, for example, total crude oil, is preheated and introduced to the flash section 53 by line 60, preferably tangentially to the tower. Substantial vaporization of the feed occurs in the preheater, not shown in the drawing. Upon introduction into the atmospheric column, further vaporization of the feed occurs in flash section 53, whereupon vapors rise upwardly through the bubble caps (not shown) of trays 52, while liquid under the centrifugal force imposed by the tangential introduction flows downwardly along the wall of tower 50, collects in tray 56, and flows substantially uniformly over ring weir 57 into the stripping section 54. Liquid accumulating at the bottom of fractionating section 51, is returned from the lowermost fractionating tray to liquid tray 56 by means of line 81.

Steam is introduced into the tower below frusto-conical member 55 by line 63, preferably tangentially to the inner circumference of the tower and counterwise to the direction of introduction of feed. In substantially the same manner as described for the vacuum tower of Figure 1, steam passes in the form of jets through the perforations of member 55 upwardly and in toward the vertical axis of stripping section 54 where intimate contact with vapor and liquid particles is achieved.

The resistance to the passage of steam through the perforations of member 55 is considerably lower than the resistance through the stripping section of a conventional atmospheric column and consequently a considerable reduction in the steam pressure as compared with conventional columns is possible. For example, in a crude oil atmospheric fractionation tower employing the stripping section of my invention, the pressure drop through the stripping section is at least about 2 pounds per square inch less than the pressure drop through a stripping section containing 5 or 6 bubble cap trays as found in conventional crude oil fractionation towers. Consequently, stripping steam which would be supplied to a conventional tower at, for example, 20 pounds per square inch of pressure, can be supplied to my tower at about 18 pounds per square inch. In atmospheric fractionation, in addition to bottoms liquid stripping, each side stream is also steam stripped. Thus, as Figure 2 shows, the side stream withdrawn from column 50 by line 65 is passed to the steam stripper 66. Stripping steam is introduced through line 70 to the bottom of stripper 66 at the same pressure as the steam introduced to stripping section 54. Steam and stripped vapors pass upwardly through the trays of stripper 66 through bubble caps, not shown. An atmospheric gas oil product is withdrawn by line 67 for introduction to the top of vacuum column 80, while stripped vapors and steam are returned to column 50, by line 68. The steam for the side stream strippers is ordinarily supplied from the same source and at the same pressure as the steam for the bottoms stripping section. The back pressure at the bottom of the tower, being the highest pressure of any point in the tower, thus governs the pressure of all steam supplied to the tower. Therefore, a lowering of the back pressure at the bottom of the tower makes it possible to lower the steam pressure of the entire quantity of steam supplied to the tower, which results in a considerable economy in operation.

The stripping section of my invention has particular usefulness in the atmospheric fractionation of crude oil when production of the maximum amount of catalytic cracking charge stock rather than close fractionation is the aim. In such a fractionation, using an atmospheric-vacuum unit as shown in Figure 2, the light atmospheric gas oil is commonly used as a condensing medium for the top of the vacuum tower.

The atmospheric gas oil is a lighter stock than vacuum gas oil and is considerably lower in wax content. If wax-containing vacuum gas oil is refluxed to the top of the vacuum tower, there is an entrainment of waxy material in the steam and light vapors passing overhead, and consequently wax will deposit on the tubes of the overhead condenser with obvious detrimental effects. This disadvantage is avoided in the usual practice by introducing the low-wax-content, atmospheric gas oil to the top of the vacuum tower, while the vacuum gas oil is withdrawn as catalytic cracking stock or is refluxed to a point in the tower which is low enough to avoid the difficulty mentioned.

From this discussion and from Figure 2, it can be seen that since the atmospheric gas oil is passed to the top of vacuum tower 80 by line 67 and atmospheric bottoms is passed to the flash section of tower 80 by line 81, there is a refractionation of the two streams in the vacuum tower and very close fractionation in the atmospheric tower is not important. The important thing to achieve in the atmospheric tower is the maximum possible vaporization so that the load on the vacuum tower in vaporizing the atmospheric tower bottoms will be at a minimum.

My process and apparatus, of course, contribute greatly to this important result by making it possible to employ high tempeartures conducive to maximum vaporization in the atmospheric tower but avoiding undue thermal decomposition of the atmospheric tower bottoms by reducing the residence time of such bottoms in the stripping section of the atmospheric tower. This important advantage is achieved with the advantage of reducing the required pressure for steam supplied to the tower for the various stripping purposes.

Except for the provision in an obvious manner of one or more additional fractionating trays above the side reflux line of tower 80, the structure of this tower and the functioning thereof may advantageously be identical with that of tower 36 in Figure 1. However, the vacuum tower structure of Figure 1 is not essential to the combination shown in Figure 2 and, if desired, tower 80 of Figure 2 may be of conventional structure.

It will be apparent that the invention in its broader aspects is not limited by details with respect to the particular structure of the fractionating section, the number or type of side streams, the use of reflux streams, the manner of recovering products, operating pressures, or other details. Similarly, the invention is not limited to any particular feed or stripping vapor. The invention has broad utility in connection with the fractionation of vaporizable, liquid mixtures and the details of these operations may be varied widely, as is well known in the art.

Specific examples of uses of my invention are in atmospheric fractionation of crude petroleum oils and in vacuum fractionation of topped petroleum crude oils. The invention also may be used for vacuum distillation of pressure distillate, pressed distillate or bright stock solution. It may also be used to reduce a tar stock to asphalt or pitch. It is to be understood that the invention is of greatest value in connection with processes wherein the greatest amount of vaporization is desired at the expense of the tower bottoms.

Among the advantages achieved by this invention is the provision of an improved atmospheric and vacuum fractionating method and apparatus permitting maximum vaporization of feed to be achieved and permitting a substantial reduction in tower bottoms. A further advantage is the provision of more homogeneous intermixture of stripping vapors and liquid in both the stripping section and the flash section. An important advantage of the invention is in the fact that residence time or hold-up time of liquid bottoms in the stripping section and in the liquid-accumulating compartment beneath the stripping section is greatly reduced, whereby a substantial increase in the operating temperature of the fractionating tower is permitted. By virtue of this fact, a substantial increase in total overhead, i. e., overhead and/or side stream products, is achieved. The decrease in residence time is effected while obtaining an excellent degree of stripping. The improved stripping device is also less expensive and more easily fabricated than previously employed structures. The stripping means of the invention is also self-cleaning. The invention also permits the use of stripping gas at lower pressures, with a high degree of vaporization and excellent stripping being obtained. Where stripping steam for side stream stripping is supplied from the same source as the tower stripping steam, an additional saving is effected by a reduction in the pressure of the overall stripping steam. Further, utilization of the invention in the atmospheric fractionation of crude oil assists the subsequent vacuum fractionating of the atmospheric tower bottoms by reducing the load on the vacuum tower in vaporizing atmospheric tower bottoms.

In the petroleum industry an important use of vacuum fractionating towers is in the separation of topped or reduced crudes to obtain a relatively clean cracking stock and vacuum tower bottoms. Accordingly, a specific advantage of the invention is that greater yields of cracking stock are obtained at the expense of the undesirable, low-quality, vacuum tower bottoms.

In the foregoing description and drawings, certain preferred embodiments of the invention have been described. It is understood that various modifications thereof may be resorted to without departing from the spirit of the invention or the scope of the appended claims.

I claim:

1. Fractionating apparatus comprising a tower, means positioned in the upper portion of said tower forming a fractionating section adapted to permit intercontact of upflowing vapor and downflowing condensate, a condensate tray within the tower at the bottom of the fractionating section adapted to collect liquid condensate from the fractionating section, a flash section within said tower beneath said condensate tray, an annular liquid retaining tray positioned at the bottom of the flash section and attached at its outer periphery to the inner surface of the tower, means forming a connection between said flash section and said fractionating section adapted to permit vapor passage from the former to the latter, a stripping section within said tower beneath said fractionating section, stripping means within said stripping section comprising a hollow, frusto-conical member positioned base upward and having a multiplicity of relatively small, substantially uniformly spaced perforations, the open upper end of the frusto-conical member being attached to the inner periphery of said annular liquid retaining tray and being adapted to receive downflowing unvaporized material from said flash section and being adapted to distribute upflowing vapors into the flash section, a liquid-accumulating compartment within said tower beneath said stripping section, the ratio of whose cross-sectional area with the cross-sectional area of the tower is between about 0.05:1 and about 0.5:1.0, a drain-leg attached to the open lower end of said frusto-conical member adapted to direct unvaporized liquid from said stripping section into said liquid-accumulating compartment, means for introducing preheated feed into the flash section, said means being adapted to discharge tangentially to the inner circumference of the tower, means for introducing stripping vapor into the tower beneath the hollow, frusto-conical member, said means being adapted to discharge tangentially to the inner circumference of the tower and counterwise to the direction of the feed, means for removing excess liquid from the condensate tray, means for returning liquid so removed to the flash section, and means for removing liquid condensate from the fractionating section.

2. The apparatus of claim 1, including in addition means in association with the top of the tower for maintaining a partial vacuum in said tower.

3. A fractionation process, comprising introducing preheated liquid-containing feed into a flash zone wherein a portion of the liquid is vaporized, passing the unvaporized portion of the feed from the flash zone into an unobstructed stripping zone therebeneath, wherein the pressure is substantially uniform throughout and substantially equal to that in the flash zone, establishing a flow of stripping vapor into said stripping zone, forming all of the stripping vapor into a multiplicity of continuously flowing jets at a plurality of elevations during introduction into the stripping zone, said jets being formed at greater distances from the vertical axis of the stirpping zone with greater elevation therein, directing said stripping vapor jets from a plurality of directions upwardly and inwardly toward the vertical axis of said stripping zone in an unobstructed path, thereby intimately commingling the stripping vapor and said unvaporized portion of the feed and vaporizing a portion of the latter, directly passing the thus vaporized portion of the feed together with stripping vapors upwardly in an unobstructed path into said flash zone, passing stripping vapor and vaporized feed from said flash zone into the lower portion of a fractionating zone, and fractionating the vaporized feed in said fractionating zone, passing the unvaporized liquid portion of the feed remaining in the stripping zone downwardly therefrom in an unobstructed path into a liquid-accumulating zone, removing fractionated material from the fractionating zone and removing unvaporized liquid from the liquid-accumulating zone.

4. The process of claim 3, including in addition the step of maintaining a partial vacuum in said zones.

5. A fractionating process comprising introducing preheated liquid-containing feed into a flash zone maintained at about atmospheric pressure wherein a portion of the feed is vaporized, passing the unvaporized portion of the feed from the flash zone into an unobstructed stripping zone therebeneath, wherein the pressure is substantially uniform throughout and substantially equal to that in the flash zone, establishing a flow of stripping vapor into said stripping zone, forming all of the stripping vapor into a multiplicity of continuously flowing jets at a plurality of elevations during introduction into the stripping zone, said jets being formed at greater distances from the vertical axis of the stripping zone with greater elevation therein, directing said stripping vapor jets from a plurality of directions upwardly and inwardly toward the vertical axis of the stripping zone in an unobstructed path, thereby intimately commingling the stripping vapor and said unvaporized portion of the feed and vaporizing a portion of the latter, directly passing the thus vaporized portion of the feed together with stripping vapors upwardly in an unobstructed path into said flash zone, passing stripping vapor and vaporized feed from said flash zone into the lower portion of a fractionating zone, and fractionating the vaporized feed in said fractionating zone, passing the unvaporized liquid portion of the feed remaining in the stripping zone downwardly therefrom in an unobstructed path into a liquid-accumulating zone, removing unvaporized liquid from said liquid-accumulating zone and introducing it into a second flash zone maintained at substantial subatmospheric pressure, whereby a further portion of the liquid is vaporized, passing the remaining unvaporized liquid downwardly from the second flash zone through a second stripping zone also maintained at subatmospheric pressure in countercurrent contact with stripping vapor, passing stripping vapor and vaporized feed from the second flash zone upwardly into a second fractionating zone also maintained at subatmospheric pressure, removing a relatively high-boiling liquid fraction from the lower portion of the first mentioned fractionating zone and introducing said liquid fraction into the top of said fractionating zone, removing fractionated material from said second fractionating zone and removing unvaporized liquid from the bottom of said second stripping zone.

6. A fractionating apparatus comprising a tower having a fractionating section in its upper portion, a stripping section in its lower portion, a flash compartment positioned intermediately between the fractionating section and the stripping section, and a liquid-accumulating compartment positioned at the base of the tower beneath the stripping section, means forming a vapor passageway connecting the flash section and the fractionating section, means for introducing preheated feed into the flash section, means for introducing stripping vapor into the stripping section, stripping means within said stripping section forming an unobstructed chamber directly connecting said flash section and the liquid-accumulating compartment, said stripping means comprising a hollow, perforated frusto-conical member positioned base upward within the tower and having a drain-leg attached to its open lower end, said drain-leg extending below the level at which liquid is maintained in said liquid-accumulating compartment, the open upper end of said frusto-conical member being adapted to receive downflowing unvaporized material from said flash compartment and to distribute upflowing vapors into said flash compartment, means for withdrawing unvaporized liquid from the liquid-accumulating compartment at the base of the tower, and means for removing fractionated material from the fractionating section of the tower.

7. The apparatus of claim 6 where the means for introducing preheated feed into the flash compartment and the means for introducing the stripping vapor into the tower are adapted to discharge tangentially to the inner circumference of the tower and counterwise to each other.

8. The apparatus of claim 6 including in addition means in association with the top of the tower for maintaining a partial vacuum in said tower.

9. A combination atmospheric-vacuum fractionating system comprising an atmospheric tower and a vacuum tower, each having a fractionating section in its upper portion, a stripping section in its lower portion, a flash compartment positioned intermediately between the fractionating section and the stripping section, and a liquid-accumulating compartment positioned at the base of the tower beneath the stripping section and means forming a vapor passageway connecting the flash section and the fractionating zone, means for introducing preheated feed into the flash section of the atmospheric tower, means for introducing stripping vapor into the stripping section of the atmospheric tower, stripping means within the stripping section of the atmospheric tower forming an unobstructed chamber directly connecting the flash section theerabove and the liquid-accumulating compartment therebelow, said stripping means comprising a hollow, perforated frusto-conical member positioned base upward within the tower and having a drain-leg attached to its open lower end, said drain-leg extending below the level at which liquid is maintained in said liquid-accumulating compartment, the open upper end of said frusto-conical member being adapted to receive downflowing unvaporized material from the flash compartment thereabove and to distribute upflowing vapors into said flash compartment, conduit means connecting the liquid-accumulating compartment of the atmospheric tower and the flash section of the vacuum tower, conduit means connecting the lower portion of the fractionating tower and the top of the fractionating section of the vacuum tower, means for removing fractionated material from the fractionating section of the vacuum tower, means for removing unvaporized liquid from the liquid-accumulating compartment of the vacuum tower, and means in association with the top of the vacuum tower for maintaining a partial vacuum therein.

References Cited in the file of this patent

UNITED STATES PATENTS

| | | |
|---|---|---|
| 2,237,271 | Dunham | Apr. 1, 1941 |
| 2,358,272 | Wilkie | Sept. 12, 1944 |
| 2,489,509 | Straight | Nov. 29, 1949 |
| 2,595,805 | Monell et al. | May 6, 1952 |
| 2,612,467 | Morrell et al. | Sept. 30, 1952 |
| 2,658,863 | Guala | Nov. 10, 1953 |

FOREIGN PATENTS

| | | |
|---|---|---|
| 369,376 | Great Britain | Mar. 24, 1932 |
| 626,658 | Great Britain | July 19, 1949 |